US011356800B2

(12) United States Patent
Ebner et al.

(10) Patent No.: US 11,356,800 B2
(45) Date of Patent: Jun. 7, 2022

(54) METHOD OF ESTIMATING INDOOR LOCATION OF A DEVICE

(71) Applicant: Xerox Corporation, Norwalk, CT (US)

(72) Inventors: Fritz Francis Ebner, Pittsford, NY (US); Raviteja Gunda, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 42 days.

(21) Appl. No.: 17/004,145

(22) Filed: Aug. 27, 2020

(65) Prior Publication Data

US 2022/0070607 A1   Mar. 3, 2022

(51) Int. Cl.

| | |
|---|---|
| *H04W 24/00* | (2009.01) |
| *H04W 4/021* | (2018.01) |
| *H04B 17/318* | (2015.01) |
| *H04W 4/029* | (2018.01) |
| *H04W 4/33* | (2018.01) |

(Continued)

(52) U.S. Cl.
CPC .......... *H04W 4/021* (2013.01); *H04B 17/318* (2015.01); *H04W 4/029* (2018.02); *H04W 4/33* (2018.02); *G06F 3/1203* (2013.01); *G06F 3/1226* (2013.01); *G06F 3/1292* (2013.01); *H04W 84/12* (2013.01)

(58) Field of Classification Search
CPC ....... H04W 4/021; H04W 4/02; H04W 4/029; H04W 4/33; H04W 4/022; H04W 4/023; H04W 4/024; H04W 4/025; H04W 84/12; H04B 17/318; H04B 17/336; G06F 3/1203; G06F 3/1226; G06F 3/1292
USPC .................................................... 455/456.1
See application file for complete search history.

(56) References Cited

U.S. PATENT DOCUMENTS

| 7,958,562 B2 | 6/2011 | Gaucas | |
|---|---|---|---|
| 8,086,248 B2 * | 12/2011 | Coronel | H04W 4/20 455/456.1 |

(Continued)

FOREIGN PATENT DOCUMENTS

| CN | 103925923 B | 6/2017 |
|---|---|---|
| JP | 2009187103 A | 8/2009 |

OTHER PUBLICATIONS

Information about Related Patent and Patent Applications, see section 6 of the accompanying Information Disclosure Statement Letter, which concerns Related Patents and Patent Applications.

(Continued)

*Primary Examiner* — Huy C Ho
(74) *Attorney, Agent, or Firm* — Fox Rothschild LLP

(57) ABSTRACT

A method of estimating indoor location of an electronic device is disclosed. The electronic device will detect multiple Wi-Fi signals, each of which originates from a unique Wi-Fi access point in a building. For each of the signals, the system will determine an access point device identifier and a signal strength indicator, retrieve location coordinates for the access point; and various candidate constants to apply to a distance calculation for determining a distance from the electronic device to each of the access points. The system will repeat the distance calculation multiple times for each of the various constants and determine which constant minimizes a loss value. The system will identify a set of coordinates of the electronic device that are associated with the constant that minimizes the loss value, and then use the coordinates to estimate a location of the electronic device within the building.

19 Claims, 7 Drawing Sheets

(51) Int. Cl.
  *G06F 3/12* (2006.01)
  *H04W 84/12* (2009.01)

(56) References Cited

U.S. PATENT DOCUMENTS

| | | | |
|---|---|---|---|
| 8,548,738 | B1 | 10/2013 | Kadous et al. |
| 8,583,400 | B2 | 11/2013 | Thrun et al. |
| 8,934,112 | B1 | 1/2015 | Gross et al. |
| 8,982,384 | B2 | 3/2015 | Evanitsky |
| 8,986,867 | B2 | 3/2015 | Baek |
| 9,201,619 | B2 | 12/2015 | Gross et al. |
| 9,367,271 | B2 | 6/2016 | Zehler et al. |
| 9,549,089 | B1 | 1/2017 | Tredoux et al. |
| 9,740,447 | B1 | 8/2017 | Krishnasamy et al. |
| 9,894,604 | B1 | 2/2018 | Tran et al. |
| 10,104,247 | B2 | 10/2018 | Packirisamy et al. |
| 10,116,826 | B1 | 10/2018 | Ravikiran et al. |
| 10,440,221 | B2 | 10/2019 | Ebner |
| 10,694,053 | B1 | 6/2020 | Ebner et al. |
| 2004/0075861 | A1 | 4/2004 | Shima et al. |
| 2004/0264427 | A1 | 12/2004 | Jaakkola et al. |
| 2006/0221901 | A1 | 10/2006 | Yaqub et al. |
| 2007/0019670 | A1 | 1/2007 | Falardeau |
| 2008/0080458 | A1 | 4/2008 | Cole |
| 2009/0028082 | A1 | 1/2009 | Wynn et al. |
| 2010/0040029 | A1 | 2/2010 | Doppler et al. |
| 2011/0063663 | A1 | 3/2011 | Kim et al. |
| 2011/0306364 | A1 | 12/2011 | Gossain et al. |
| 2012/0075664 | A1 | 3/2012 | Nichols et al. |
| 2012/0179737 | A1 | 7/2012 | Baranov et al. |
| 2013/0286942 | A1 | 10/2013 | Bonar et al. |
| 2013/0346138 | A1 | 12/2013 | Rai |
| 2014/0022587 | A1* | 1/2014 | Coccia ............... G01S 19/14 358/1.15 |
| 2014/0256286 | A1 | 9/2014 | Rangarajan |
| 2015/0189023 | A1 | 7/2015 | Kubota et al. |
| 2015/0358790 | A1 | 12/2015 | Nasserbakht |
| 2015/0363141 | A1 | 12/2015 | Fernandes et al. |
| 2017/0006436 | A1* | 1/2017 | Ahmed ............... H04W 4/33 |
| 2017/0008174 | A1 | 1/2017 | Rosen et al. |
| 2017/0123737 | A1 | 5/2017 | Januszewski et al. |
| 2017/0142549 | A1 | 5/2017 | Herbert et al. |
| 2017/0171718 | A1 | 6/2017 | Jeong et al. |
| 2017/0289813 | A1 | 10/2017 | Pashkov et al. |
| 2017/0304732 | A1 | 10/2017 | Velic et al. |
| 2017/0347388 | A1 | 11/2017 | Cai et al. |
| 2018/0083795 | A1 | 3/2018 | Zehler et al. |
| 2018/0172451 | A1 | 6/2018 | Wang et al. |
| 2018/0237137 | A1 | 8/2018 | Tovey et al. |
| 2018/0249298 | A1 | 8/2018 | Jain et al. |
| 2018/0316821 | A1 | 11/2018 | Ebner |
| 2018/0367698 | A1 | 12/2018 | Krishnasamy et al. |
| 2019/0014233 | A1 | 1/2019 | Krishnasamy et al. |
| 2019/0026051 | A1 | 1/2019 | Krishnasamy et al. |
| 2019/0026052 | A1 | 1/2019 | Krishnasamy et al. |
| 2019/0114804 | A1 | 4/2019 | Sundaresan et al. |
| 2019/0304102 | A1 | 10/2019 | Chen et al. |
| 2019/0373407 | A1 | 12/2019 | Bhatti et al. |
| 2020/0193609 | A1 | 6/2020 | Dharur et al. |

OTHER PUBLICATIONS

Saxena, A. et al., "Learning Depth from Single Monocular Images".
Godard, C. et al., "Digging Into Self-Supervised Monocular Depth Estimation".
Bhoi, A., "Monocular depth Estimation: A Survey", [cs.CV] Jan. 27, 2019.
Wu, Y. et al., "HTrack: An Efficient Heading-Aided Map Matching for Indoor Localization and Tracking", IEEE Sensors Journal, vol. 19, No. 8, Apr. 15, 2019.
Seco, F. et al., "Smartphone-Based Cooperative Indoor Localization with RFID Technology", Sensors 2018, 18, 266.
Murata M. et al., "Smartphone-based Indoor Localization for Blind Navigation across Building Complexes", 2018 IEEE International Conference on Pervasive Computing and Communications (PerCom).
Yang, J. et al., "Indoor Localization Using Improved RSS-Based Lateration Methods", IEEE "GLOBECOM" 2009 Proceedings.
Cotera P. et al., "Indoor Robot Positioning using an Enhanced Trilateration Algorithm", International Journal of Advanced Robotic Systems, 2016, 13:110 I doi: 10.5772/63246.
Maduskar, D. et al. , "RSSI based adaptive indoor location tracker", Maduskar and Tapaswi Scientific Phone Apps and Mobile Devices (2017) 3.3, DOI 10.1186/s41070-017-0015-z.
Wang, S. et al., Detecting Stairs and Pedestrian Crosswalks for the Blind by RGBD Camera, Feb. 25, 2013, 2012 IEEE International Conference on Bioinformatics and Biomedicine Workshops (BIBMW), pp. 732-736.
Saleh, K. End-to-End Indoor Navigation Assistance for the Visually Impaired using Monocular Camera, Jan. 17, 2019, 2018 IEEE International Conference on Systems, Man, and Cybernetics (SMC), pp. 3504-3508.
Ashraf, I., Application of Deep Convolutional Neural Networks and Smartphone Sensors for Indoor Localization, Jun. 6, 2019, Applied Sciences, 2019, 9: 2337, p. 1-10.
KC, S., Obstacle Detection, Depth Estimation and Warning System for Visually Impaired People, Dec. 12, 2019, 2019 IEEE Region 10 Conference, pp. 863-865.
Kang, H., Obstacle Detection and Alert System for Smartphone AR Users, VRST '19, Nov. 12-15, 2019, Parramatta, NSW, Australia, 2019 Association for Computing Machinery.
U.S. Appl. No. 16/878,753, filed May 20, 2020, Wireless Location Tracking Tag for Monitoring Real Time Location-Tracking Apparatus for an Electronic Device.
U.S. Appl. No. 17/326,477, filed May 21, 2021, Indoor Positioning System for a Mobile Electronic Device.
U.S. Appl. No. 17/088,786, filed Nov. 4, 2020, System and Method for Indoor Navigation.
U.S. Appl. No. 16/809,901, filed Mar. 5, 2020, Methods and Systems for Sensing Obstacles in an Indoor Environment.
U.S. Appl. No. 17/189,361, filed Mar. 2, 2021, System and Method to Manage Building Occupancy Based on Disease Risk, Location Capacity and Occupant Loading.

* cited by examiner

METHOD OF ESTIMATING INDOOR LOCATION OF A DEVICE

BACKGROUND

Methods of determining the location of electronic device have many applications. For example, device location can be used to help a map application guide a user to a desired destination, to provide the device's user with local weather or safety alerts, or to provide the user with information that is relevant to the user's location. More recently, device location processes have found new applications including social interaction by social networking apps, and contact tracing to help prevent the spread of infectious disease.

Device location systems typically rely on global positioning system (GPS) signals to identify the device's location. However, GPS signals are often not reliable when a device is inside of a building. While a GPS signal could be used to determine that a device is within a building, it is typically not able to pinpoint the device's location within the building. This is a particular challenge in multi-story buildings, and/or office buildings that have many rooms.

Existing methods of indoor location tracking are known. Common methods include determining the location between the device and multiple access points by using a free space path loss equation that considers the relative signal strength of the signals received from each access point, or by using a non-linear least squares method. However, these methods are prone to error, and often cannot determine a precise location of the device.

This document describes methods and systems that are directed to solving at least some of the issues described above.

SUMMARY

In various embodiments, a method of estimating indoor location of an electronic device is disclosed. A transceiver of an electronic device that is in the building will detect multiple Wi-Fi signals, each of which originates from a unique Wi-Fi access point in the building. For each of the Wi-Fi signals, the system will process the signal to determine an access point device identifier and a received signal strength indicator (RSSI). The system will access a data set of access point data and retrieve location coordinates for the access point. The system will identify various candidate constants to apply to a distance calculation for determining a distance from the electronic device to each of the access points, and it will select one of the candidate constants. The system will estimate a location of the electronic device, and it will use the estimated location of the electronic device and the location coordinates in a first calculation for each access point to determine first distances between the electronic device and each of the access points. The system will use the selected constant and the RSSI for each of the signals in a second calculation to determine second distances from the electronic device to each of the access points. The system will applying an error calculation function to the first differences and the second differences to determine a loss value. The system will repeat the determining of first distances, the determining of second distances, and the determining of a loss value for a plurality of constants and estimated locations to return additional loss values. The system will use a multilateration function to identify a constant that minimize the loss values. The system will identify a set of coordinates of the electronic device that are associated with the constant that minimizes the loss value. The system will return the set of coordinates to the electronic device or a remote device for use in estimating a location of the electronic device within the building.

In various embodiments, the error calculation function may include determination of a mean square error.

In various embodiments, the second calculation to determine the second distances may include a free space path loss equation. The free space loss equation may be:

$$\mathrm{Log}(d) = (K - 20\, \mathrm{Log}(f) - \mathrm{RSSI})/20$$

in which K is the constant; f is the frequency of the detected signal; and RSSI is the signal strength indicator of the access point from which the detected signal was received.

In various embodiments, the multilateration function may include a non-linear least squares objective function.

Optionally, the system also may access a data store containing coordinates for equipment in the building. The system may use the returned set of coordinates of the electronic device to identify, from the data store, an item of equipment having coordinates that are proximate to the returned set of coordinates of the electronic device. The electronic device or a remote computing device may then send a command to the identified item of equipment to perform a function. For example, if the identified item of equipment is a print device, the system may command the identified print device to perform a print job.

DETAILED DESCRIPTION

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" (or "comprises") means "including (or includes), but not limited to."

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

Additional terms that are relevant to this disclosure will be defined at the end of this Detailed Description section.

This document describes an improved multilateration method for estimating the indoor location of mobile devices. The method can be used to pinpoint the location of a mobile electronic device that a user is carrying around the building or that us automatically moving around a building. The method can also be used to quickly determine the location of stationary devices, such as print devices or other equipment, in order to help maintenance personnel and/or users quickly locate a particular device within a building. In a building that contains one or more Wi-Fi networks and multiple network access points, the method can leverage existing equipment and does not require the installation of additional location devices such as beacons or cameras positioned within the building, or tags that are attached to the electronic device.

Figure 1:
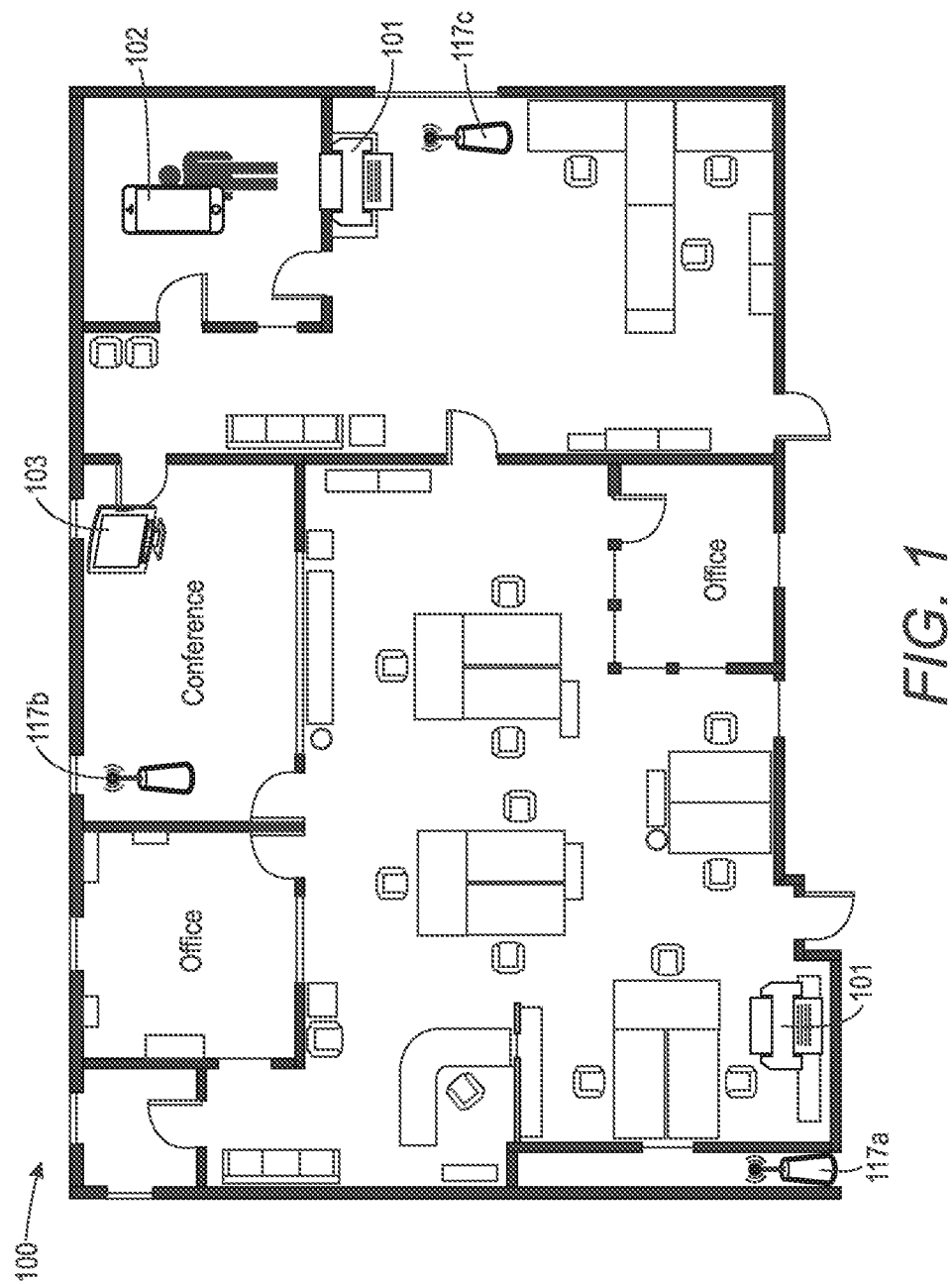
FIG. 1 illustrates an example floor plan of a building having multiple wireless access points, with locations of multiple electronic devices in the building.

FIG. 1 depicts an example floor map 100 of a floor of an office building. The building includes various rooms and corridors, and various electronic devices are located within the facility. The electronic devices may include stationary devices such as print devices 101 and computer display devices 103, and/or mobile devices 102 such as mobile phones, laptop computers, or tablet computing devices. The building is equipped with a wireless local area network (WLAN) having any number of access points 117a-117c. While three access points are shown in this image, this number is only by way of example. Any number of wireless access points may be used, and the total building map may include multiple floors, each with multiple access points. Each access point connects to a router, switch or hub and transmits a Wi-Fi signal to a limited area so that electronic devices that are within the access point's area can communicatively connect to the WLAN via one of the access points.

Figure 2:
FIG. 2 illustrates data about a wireless access point that an electronic device may receive with a signal from the wireless access point.

In various embodiments, a system may store a digital representation of a floor map 100 such as that shown. As shown in the example data set of FIG. 2, the digital representation will include coordinates for each access point (such as x-coordinates 202 and y-coordinates 203), along with a unique identifier for each access point such as an alphanumeric device identification code 201 and/or media access control (MAC) address 204. The system may store this information in a table or other data structure. The system may refer to the access point, and optionally also to other map data (such as a room in which each access point is located), when estimating the location of an electronic device within the region of the map, as will be described below.

Each electronic device that connects to the WLAN (such as electronic devices 101-103 of FIG. 1) will be equipped with a transceiver for wirelessly communicating with the WLAN and or other devices on the network. The transceiver may be configured for any suitable communication protocol, including any of the IEEE 802.11 family of standards, near-field or short range communication, Bluetooth or Bluetooth Low Energy, and/or other protocols.

When an electronic device is located within a building having multiple access points, its transceiver may detect more than one access point's signal. This is illustrated by way of example in FIG. 3, in which an electronic device 305 is located within the communication ranges of access points 301, 302 and 303. The x, y coordinates of each access point are known from the data set of FIG. 2. The electronic device 305 (or a remote server that is in wireless communication with the electronic device 305) may determine the location (x, y coordinates) of the electronic device 305 by determining the distances $d_1$, $d_1$, $d_1$, between the electronic device 305 and each detected access point 301, 302 and 303 for which the electronic device 305 detects a signal.

To enable the determination of distance between the electronic device and each access point, the device may measure the signal strength of each access point's received signal and store the measurement as a received signal strength indicator (RSSI). Methods of determining a RSSI for an access point's signal are known and are common in devices that employ IEEE 802.11 communication standards. However, other methods of measuring signal strength may be used, such as known methods of determining a received channel power indicator (RCCI) or Rx level, all of which are intended to be included within the scope of this disclosure as a substitute for RSSI. Most signals have a dynamic range, and signal strength is not a constant. Therefore, RSSI is typically not measured not as an instantaneous value, but instead as an average of signal strength received over a period of time. RSSI may be output as a DC analog level, represented in terms of milliwatts, decibels per milliwatt (dBM) or another unit of measure. In some systems, RSSI may be a negative number, such as a range of −100 to 0 with zero representing the highest possible signal strength; in others, RSSI may be a positive number, such as a range of 0 to 100 or 0 to 127 with zero representing the lowest possible signal strength.

In some of the present embodiments, the system may use RSSI to determine the distance to each access point for which a signal is detected. As noted in the Background section of this document, it is known to use a free space path loss equation to measure this distance. However, such systems are prone to error. In a known free space loss equation, the distance d from the electronic device to each access point is determined as:

$$\text{Log}(d)=(K-20\ \text{Log}(f)+\text{abs}(\text{RSSI}))/20$$

in which:
K is a constant;
f is the frequency of the detected signal; and
RSSI is the signal strength indicator in dBm.

Figure 3:
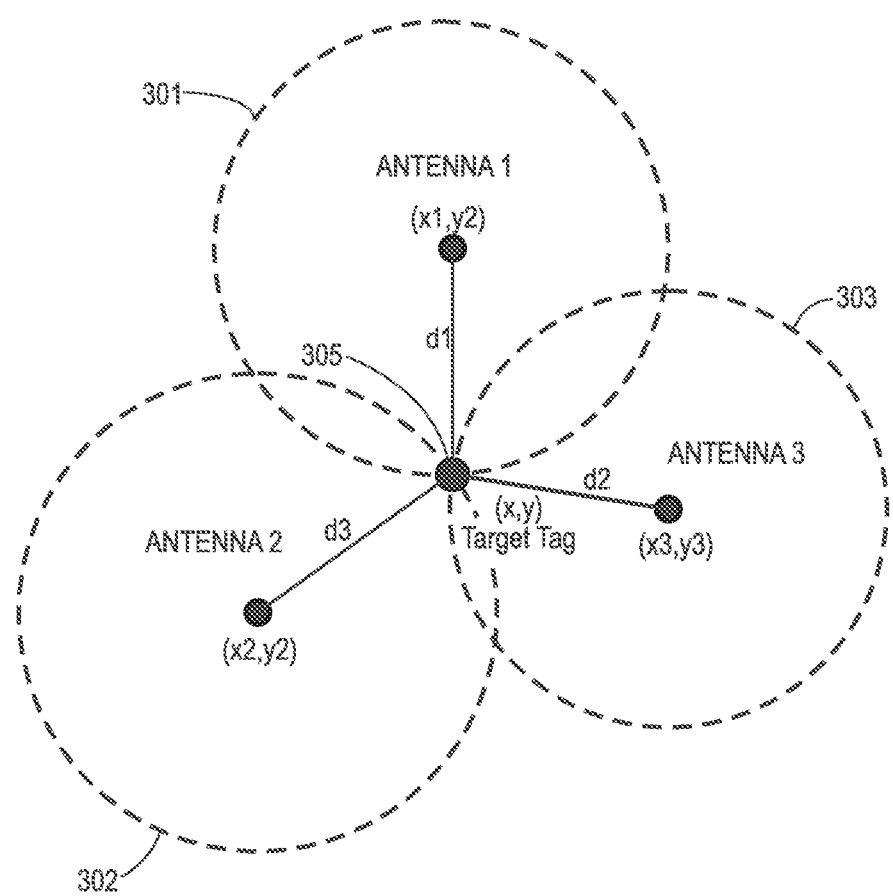
FIG. 3 illustrates an example of how multilateration may be used to determine a location of an electronic device.

Once the distances between the electronic device and multiple access points are known, a localization algorithm such as min-max, trilateration or multilateration can be used to determine the device's coordinates. In a multilateration algorithm, each access point's coordinates (as retrieved from a data set using the access point's identifier) will serve as the center of a circle to be drawn around the access point. The diameter of the circle will be a function of the RSSI, such that a larger circle reflects a larger signal strength. The electronic device's location may be determined at a location where the circles intersect. For example, the ideal situation of illustrated in FIG. 3 shows that the distances between the electronic device 305 and the access points 301-303 are approximately equal, and the circles overlap.

Figure 4:
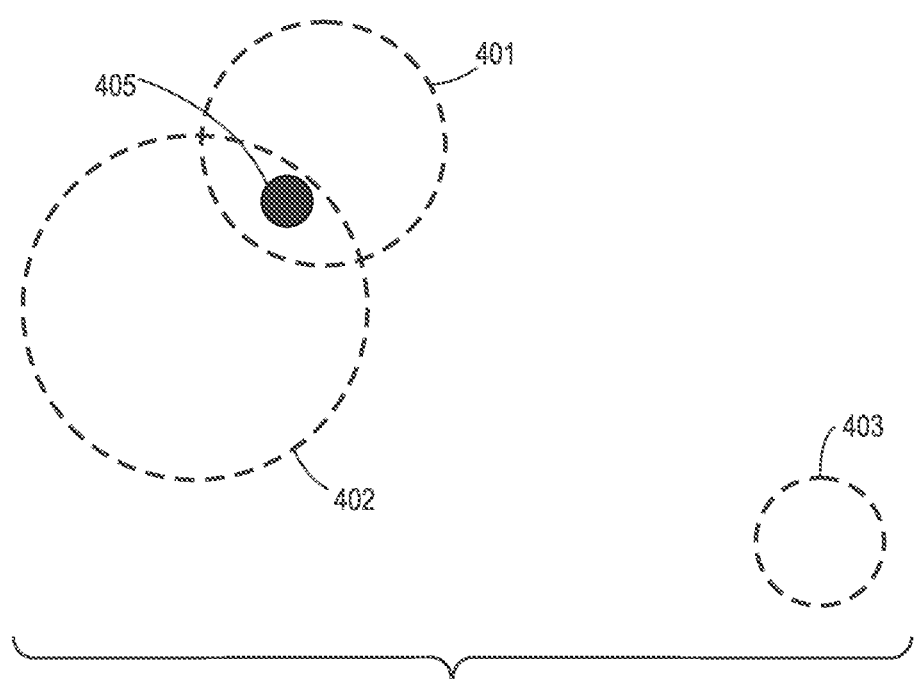
FIG. 4 illustrates an example of how error can interfere with the accuracy of a multilateration calculation.

However, this is not always the case, and while the free space loss algorithm determines distance, it can result in error. For example, FIG. 4 illustrates that in some situations error can result in a "lone access point" 403, in which the signal strength of the access point results in a circle that does not overlap with the circles for the other access points 401, 402. With a lone access point scenario, in theory the electronic device 405 should not have detected the signal of access point 403. However, since the electronic device 405 actually did detect the signal of access point 403, error has been introduced into the calculation.

In some embodiments, the error in a distance calculation can be estimated as a mean square error (MSE), as follows:

$$MSE = \frac{\sum_{i=1}^{n}(D1-D2)^2}{n}$$

in which:

D1 is the calculated distance from the electronic device to the access point based on the estimated location from the result of the multilateration calculation; and D2 is the distance to each access point that is calculated using the free space path loss equation for a given K.

Figure 5:
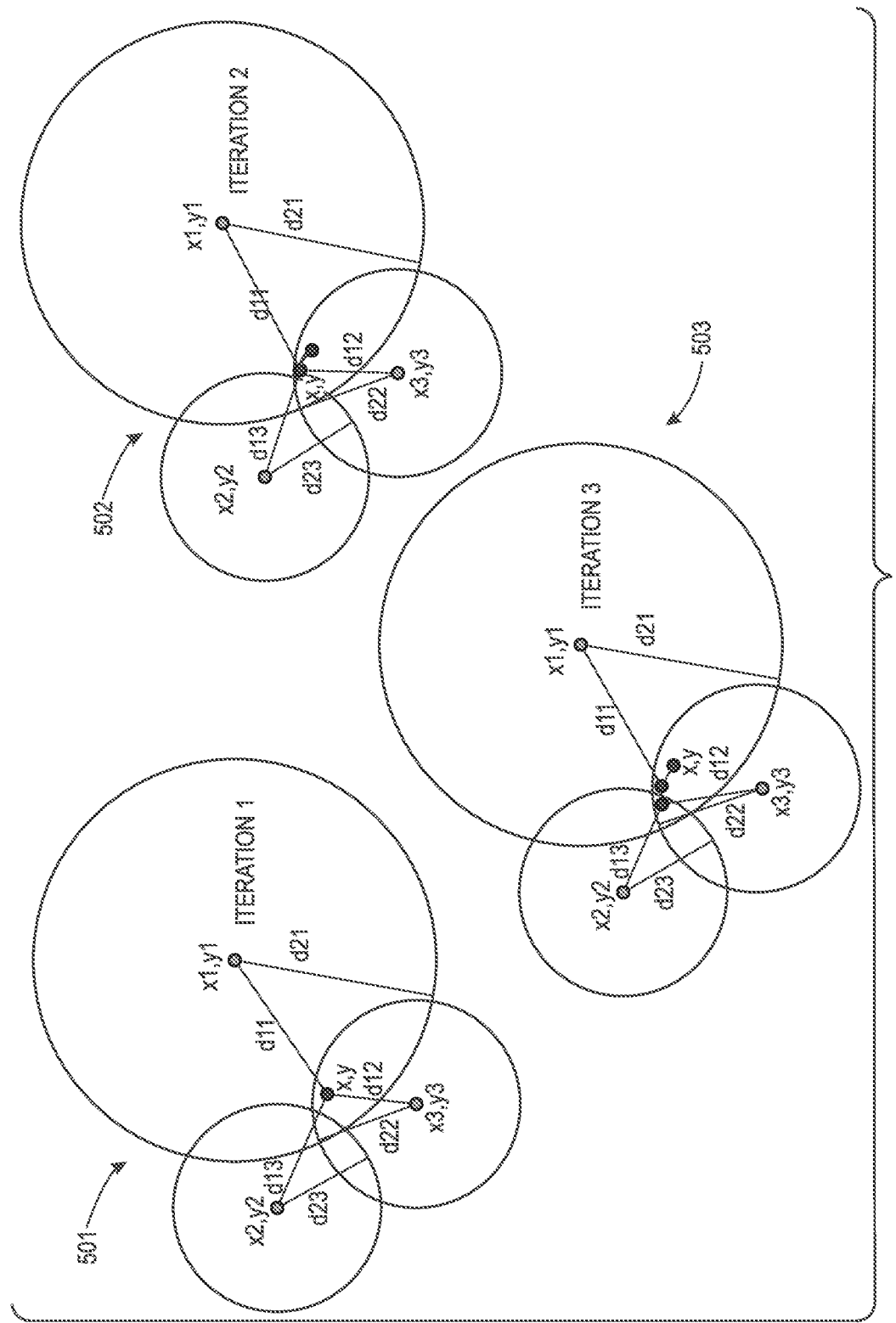
FIG. 5 illustrates an example of a multlateration function.

In prior systems, the system may use a nonlinear least squares function as the multilateration calculation. To do this, the system may first estimate a possible location of the electronic device using any suitable method, such as an average position of the access points (i.e., the initial Xtest=average of access point x's, and Ytest=average of access point y's). The system may then determine a difference between D1 (distance from the electronic device's estimated possible location and each access point's actual location) and D2 (the distance to each access point that using the free space path loss equation for a given K and detected RSSI). The system may then determine MSE as the mean of the square of the differences for all access points (i.e., the MSE calculation above). The system may then repeat this for multiple candidate electronic device locations, varying the possible Xtest, Ytest coordinates of the electronic device as (until MSE is minimized, using any suitable minimization algorithm, such as Newton's method of gradient descent. This is illustrated graphically in FIG. 5, in which three iterations 501, 502 and 503 of the algorithm are run. In each iteration, three access points are shown, with known coordinates xn, yn positioned in the center of a circle with a diameter d21, d22, d23 that is determined based on the detected RSSI of the access point. In iteration 501, initial coordinates x, y are estimated, distances d1, d12, d13 from those coordinates to each access point are determined, and the MSE is calculated. In iteration 502, this process is repeated for a different set of x, y coordinates are selected, and the MSE returned is less than that of iteration 501, this continues until the MSE values converge after any suitable number of iterations (with convergence—representing loss minimization—shown as iteration 503.

Alternatively, instead of MSE, the system may determine error using another function that relies on the distances, such as root mean square error, maximum error, mean error, or the like.

The present system improves on prior techniques by varying the constant K in the free space loss equation within various constraints, rather than treating K as a fixed constant as in the prior art. This allows the system to determine an "optimized K" per access point that minimizes overall MSE.

In some embodiments, the system selects various values of K that are in the range of approximately 24 to approximately 28, although other ranges may be used. The system uses a random initial condition for K for each access point (though other initial conditions can be used, such as the resulting K from the last optimization run). The system then determines, for each access point, the K value that minimizes the MSE distance error between the RSSI calculated distance and the multilateration calculated distances. This may be illustrated in the following pseudocode, in which for any Xtest, Ytest and array of Ks:

```
newLossFunction(Xtext, Ytest, ArrayOfKs):
  sse=0; mse=0
    APX=Aps[index].X; APY=Aps[index].Y
    APRSSI=Aps[index].RSSI; Apfrequency=Aps[index].
      freq
    K=ArrayOfKs[index]
    dFromKandRSSI=10^[[K-(20*log 10(Apfrequency))+
      abs(APRSSI)]/20]
    d=sqrt[(Xtest-APX)^2+(Ytest-APY)^2]
    sse=sse+(d-dFromKandRSSI)^2
  mse=sse/(Number of Aps in list of APs)
  return mse.
``` in which:

Xtest, Ytest and ArrayOfKs are inputs to the loss function that are varied to find minimum mse;

APX, APY are known locations of the access point (AP); and

APRSSI and Apfrequency are the signal strength and frequency from each AP.

The system then selects, for each access point, the K that minimizes the loss, and it uses that K in the free space path loss equation to determine the distances to each access point. In this scenario, the term "minimize" is the minimization of a scalar function in which the MSEs for all access point distances are considered, and the K is selected for each access point that will optimize (i.e., most reduce on a collective basis) the loss function in all of the distance calculations. Various optimization algorithms may be used, such as Newton's method of gradient descent as mentioned above, the known Nelder-Mead minimization process (which uses the Simplex algorithm) and the algorithm known as CG, which uses a nonlinear conjugate gradient algorithm.

Figure 6:
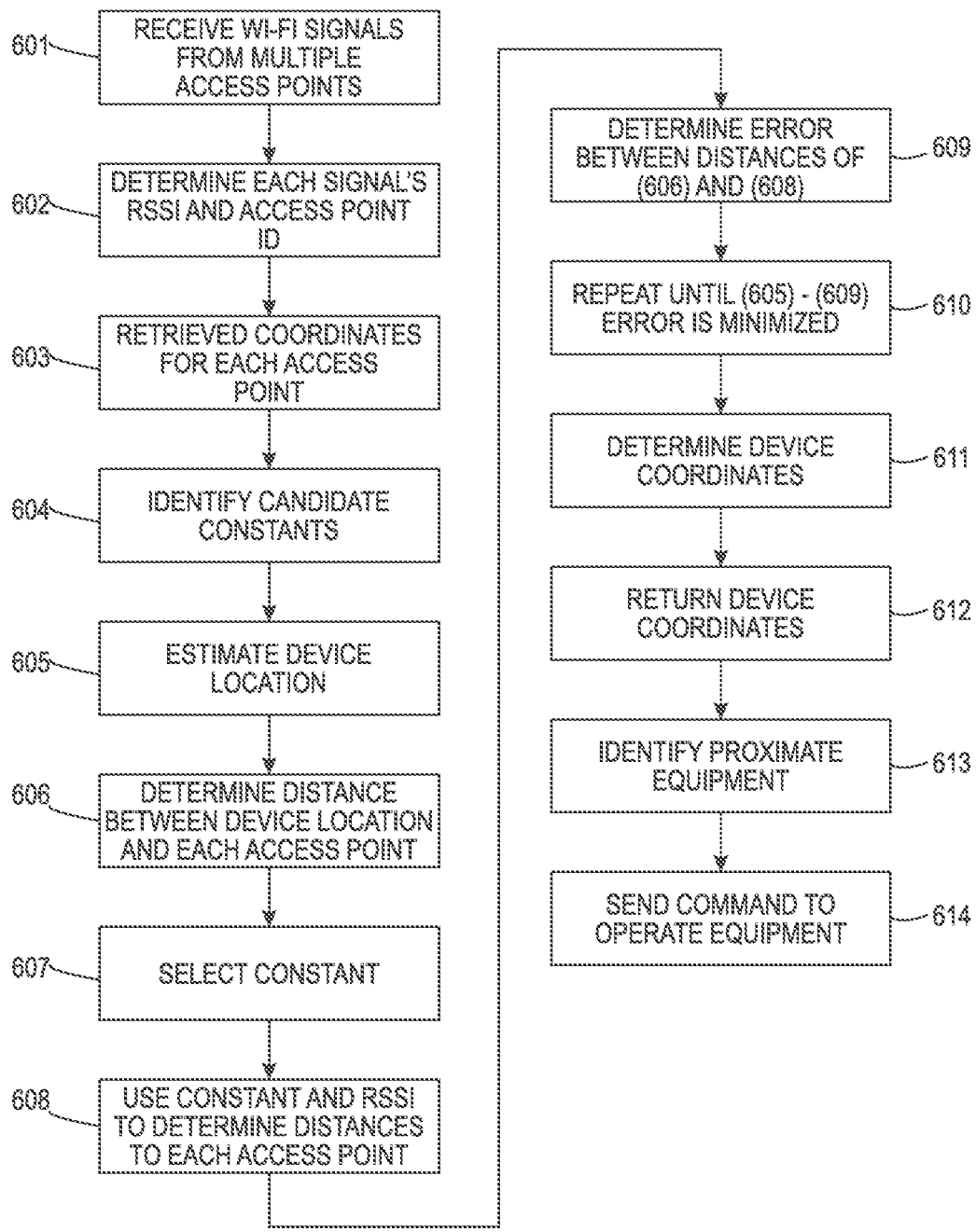
FIG. 6 illustrates an example location estimation process.

This process is further illustrated in the flow diagram of FIG. 6. At 601, a transceiver of an electronic device, detecting a multiple of Wi-Fi signals, each of which originates from a unique Wi-Fi access point in a building. The electronic device, a processor of a remote computing device that is in wireless communication with the electronic device, or a combination of the two may execute programming instructions to analyze the signal and use results of the analysis to determine the coordinates of the electronic device. The one or more processors will, for each of Wi-Fi signals, analyze the signal to determine an access point device identifier (such as a name and/or MAC address) and a RSSI (step 602). At 603, the processor(s) will access a data set of access point data and retrieve location coordinates for each access point. At 60, the system will identify multiple candidate constants (i.e., K-values) to apply to a distance calculation for determining a signal strength-based distance from the electronic device to each of the access points. At 605, the system will estimate a device location for the electronic device. At 606, the system will determine distances between the initial device location and each access point. At 607, the system will select a candidate constant to use in a signal strength-based distance calculation. At 608 the system will use the identified constant and the signal strength in a distance calculation to determine a distance from the electronic device to each of the access points. At 609 the system will determine the error between the coordinate-based distance (from step 606) and the signal strength based distance (from step 609). At 610 the system will repeat steps 605-609 using different estimated coordinate values and different constants until the error is minimized. The system will then identify the electronic device coordinates of the iteration in which error is minimized at 611. At 612 the processors will then return the set of coordinates to the electronic device or a remote device for use in estimating a location of the electronic device within the building.

The estimation of electronic device location may have any number of practical applications. For example, a remote server can use the method to return a location of a missing or misplaced mobile electronic device, such as a mobile phone, tablet computing device or laptop. The system can also be used to identify equipment that is in the building so that the electronic device can send commands to operate that equipment (steps 613 and 614) For example, f the building includes a network of print devices, each having a known location stored in a data store, then when the mobile electronic device's location is returned the system can access the data store's coordinate data to identify the print device having coordinates that are closest to the electronic device's location, and the mobile electronic device or a remote computing device may then use a print driver to send a print job to the identified print device so that the print device can process and print the print job.

Figure 7:
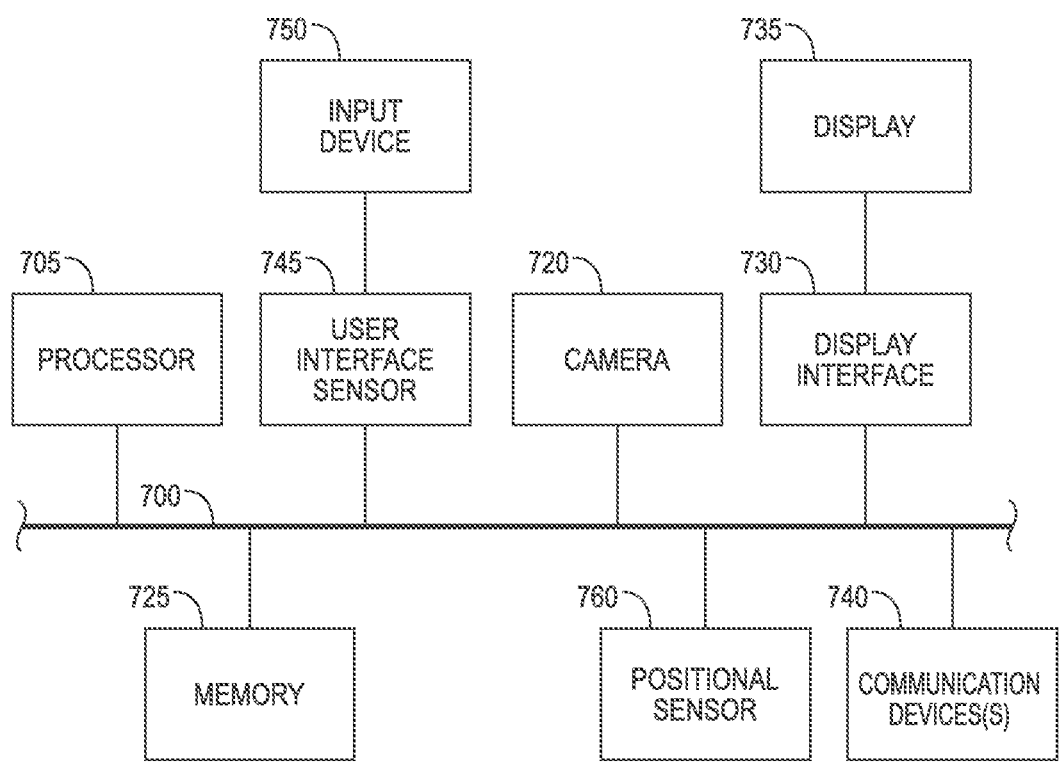
FIG. 7 illustrates components of an example electronic device.

FIG. 7 depicts an example of internal hardware that may be included in any of the electronic components of the system, such as any of the electronic devices 101-103 of FIG. 1, or of a remote server with which the electronic devices communicate. An electrical bus 700 serves as an information highway interconnecting the other illustrated components of the hardware. Processor 705 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 725. A memory device may include a single device or a collection of devices across which data and/or instructions are stored. The memory device may store data, such as the data set of access point information described above.

An optional display interface 730 may permit information from the bus 700 to be displayed on a display device 735 in visual, graphic or alphanumeric format. An audio interface and audio output (such as a speaker) also may be provided. Communication with external devices may occur using various communication devices 740 such as a wireless antenna, an RFID tag and/or short-range or near-field communication transceiver, each of which may optionally communicatively connect with other components of the device via one or more communication system. The communication device 740 may be configured to be communicatively connected to a communications network, such as the Internet, a local area network or a cellular telephone data network.

The hardware may also include a user interface sensor 745 that allows for receipt of data from input devices 750 such as a keyboard, a mouse, a joystick, a touchscreen, a touch pad, a remote control, a pointing device and/or microphone. The system also may include positional sensors 780 such as a global positioning system (GPS) sensor device that receives positional data from an external GPS network.

Terminology that is relevant to this disclosure includes:

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, laptop computers, digital display devices, print devices, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices are discussed above in the context of FIG. 6.

The term "print device" refers to a machine having hardware capable of reading a digital document file and use the information from the file and associated print instructions to print of a physical document on a substrate. Components of a print device typically include a print engine, which includes print hardware such as a print head, which may include components such as a print cartridge containing ink, toner or another print material, as well as a document feeding system configured to pass a substrate through the print device so that the print head can print characters and/or images on the substrate. In some embodiments, a print device may have additional capabilities such as scanning or faxing and thus may be a multifunction device.

The term "print job" refers to a set of digital data that represents text, images and/or other content that a print device will print on a substrate The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of estimating indoor location of an electronic device, the method comprising:
by a transceiver of an electronic device, detecting a plurality of Wi-Fi signals, each Wi-Fi signal originating from a corresponding Wi-Fi access point in a building; and
by one or more processors:
for each of the plurality of Wi-Fi signals:
analyzing the signal to determine an access point device identifier and a received signal strength indicator (RSSI); and
accessing a data set of access point data and retrieving location coordinates for the corresponding access point,
identifying a plurality of candidate constants to apply to a distance calculation for determining a distance from the electronic device to each of the access points,
selecting a constant from the plurality of candidate constants,
estimating a location of the electronic device,
using the estimated location of the electronic device and the location coordinates in a first calculation for each access point to determine first distances between the electronic device and each of the access points,
using the selected constant and the RSSI for each of the signals in a second calculation to determine second distances from the electronic device to each of the access points,
applying an error calculation function to the first distances and the second distances to determine a distance error,
repeating the determining of first distances, the determining of second distances, and the determining of a distance error for a plurality of constants and estimated locations to return additional distance errors,
using a multilateration function to identify a constant that minimizes the distance error,
identifying a set of coordinates of the electronic device that are associated with the constant that minimizes the distance error, and
returning the set of coordinates to the electronic device or a remote device for use in estimating a location of the electronic device within the building.

2. The method of claim 1, wherein the error calculation function comprises determination of a mean square error.

3. The method of claim 1, wherein the second calculation to determine the second distances comprises a free space path loss equation.

4. The method of claim 3, in which the free space loss equation comprises:

$$\mathrm{Log}(d) = (K - 20\,\mathrm{Log}(f) - (\mathrm{RSSI}))/20$$

in which:
K is the selected constant,
f is the frequency of the detected signal, and
RSSI is the signal strength indicator of the access point from which the detected signal was received.

5. The method of claim 1, wherein the multilateration function comprises a non-linear least squares objective function.

6. The method of claim 1, further comprising:
accessing a data store containing coordinates for equipment in the building;
using the returned set of coordinates of the electronic device to identify, from the data store, an item of equipment having coordinates that are proximate to the returned set of coordinates of the electronic device; and
sending a command to the identified item of equipment to perform a function.

7. The method of claim 6, wherein:
the identified item of equipment is a print device; and
the function is printing a print job.

8. A system for estimating indoor location of an electronic device, the system comprising:
an electronic device comprising a transceiver; and
one or more processors; and
a memory device containing programming instructions that are configured to cause the one or more processors to:
determine that the transceiver has detected a plurality of Wi-Fi signals, each Wi-Fi signal originating from a corresponding Wi-Fi access point in a building,
for each of the plurality of Wi-Fi signals:
analyze the signal to determine an access point device identifier and a received signal strength indicator (RSSI); and
access a data set of access point data and retrieve location coordinates for the corresponding access point, and
identify a plurality of candidate constants to apply to a distance calculation for determining a distance from the electronic device to each of the access points,
select a constant from the plurality of candidate constants,
estimate a location of the electronic device,
use the estimated location of the electronic device and the location coordinates in a first calculation for each access point to determine first distances between the electronic device and each of the access points,
use the selected constant and the RSSI for each of the signals in a second calculation to determine second distances from the electronic device to each of the access points,
apply an error calculation function to the first distances and the second distances to determine a distance error,
repeat the determining of first distances, the determining of second distances, and the determining of a distance error for a plurality of constants and estimated locations to return additional distance errors,
use a multilateration function to identify a constant that minimizes the distance errors,
identify a set of coordinates of the electronic device that are associated with the constant that minimizes the distance error, and
return the set of coordinates to the electronic device or a remote device for use in estimating a location of the electronic device within the building.

9. The system of claim 8, wherein the error calculation function comprises determination of a mean square error, and the second calculation to determine the second distances comprises a free space path loss equation.

10. The system of claim 9, in which the free space loss equation comprises:

$$Log(d)=(K-20\ Log(f)-(RSSI))/20$$

in which:
K is the selected constant,
f is the frequency of the detected signal, and
RSSI is the signal strength indicator of the access point from which the detected signal was received.

11. The system of claim 8, wherein the multilateration function comprises a non-linear least squares objective function.

12. The system of claim 8, further comprising:
a data store containing coordinates for equipment in the building; and
additional programming instructions that are configured to cause the one or more processors to:
access the data store,
use the returned set of coordinates of the electronic device to identify, from the data store, an item of equipment having coordinates that are proximate to the returned set of coordinates of the electronic device, and
send a command to the identified item of equipment to perform a function.

13. The system of claim 12, wherein:
the item of equipment is a print device; and
the function is printing a print job.

14. The system of claim 12, wherein the one or more processors are each components of the electronic device.

15. The system of claim 12, wherein the one or more processors comprise:
at least one processor that is a component of the electronic device; and
at least one processor that is a component of a remote computing device that is in communication with the electronic device.

16. A memory containing programming instructions that are configured cause one or more processors to estimate indoor location of an electronic device by:
determining that a transceiver of the electronic device has detected a plurality of Wi-Fi signals from a plurality of access points, each Wi-Fi signal originating from a corresponding Wi-Fi access point in a building; and
for each of the plurality of Wi-Fi signals:
analyzing the signal to determine an access point device identifier and a received signal strength indicator (RSSI), and
accessing a data set of access point data and retrieving location coordinates for the corresponding access point;
identifying a plurality of candidate constants to apply to a distance calculation for determining a distance from the electronic device to each of the access points;
selecting a constant from the plurality of candidate constants;
estimating a location of the electronic device;
using the estimated location of the electronic device and the location coordinates in a first calculation for each access point to determine first distances between the electronic device and each of the access points;
using the selected constant and the RSSI for each of the signals in a second calculation to determine second distances from the electronic device to each of the access points;
applying an error calculation function to the first distances and the second distances to determine a distance error;
repeating the determining of first distances, the determining of second distances, and the determining of a distance error for a plurality of constants and estimated locations to return additional distance errors;
using a multilateration function to identify a constant that minimizes the distance error;
identifying a set of coordinates of the electronic device that are associated with the constant that minimizes the distance error; and
returning the set of coordinates to the electronic device or a remote device for use in estimating a location of the electronic device within the building.

17. The memory of claim 16, wherein:
the error calculation function comprises determination of a mean square error; and
the second calculation to determine the second distances comprises a free space path loss equation.

18. The memory of claim 17, in which the free space loss equation comprises:

$$Log(d)=(K-20\ Log(f)-(RSSI))/20$$

in which:
K is the selected constant,
f is the frequency of the detected signal, and
RSSI is the signal strength indicator of the access point from which the detected signal was received.

19. The memory of claim 17, wherein the multilateration function comprises a non-linear least squares objective function.

* * * * *